US009278608B2

(12) United States Patent
Mingay et al.

(10) Patent No.: US 9,278,608 B2
(45) Date of Patent: Mar. 8, 2016

(54) D-RING FOR USE WITH A VISOR

(71) Applicant: Irvin Automotive Products, Inc., Pontiac, MI (US)

(72) Inventors: John Carl Mingay, Troy, MI (US); Steven Ernest deHagen, Washington Township, MI (US)

(73) Assignee: IRVIN AUTOMOTIVE PRODUCTS, INC., Pontiac, MI (US)

( * ) Notice: Subject to any disclaimer, the term of this patent is extended or adjusted under 35 U.S.C. 154(b) by 0 days.

(21) Appl. No.: 14/299,315

(22) Filed: Jun. 9, 2014

(65) Prior Publication Data

US 2015/0352928 A1 Dec. 10, 2015

(51) Int. Cl.
*B60J 3/00* (2006.01)
*B60J 3/02* (2006.01)

(52) U.S. Cl.
CPC ..................... *B60J 3/0217* (2013.01)

(58) Field of Classification Search
CPC ...................................... B60J 3/0217
See application file for complete search history.

(56) References Cited

U.S. PATENT DOCUMENTS

| 2,549,200 | A | 4/1951 | Hooks |
|---|---|---|---|
| 2,637,128 | A | 5/1953 | Weeks |
| 2,726,757 | A | 12/1955 | Kellstrom |
| 2,867,925 | A | 1/1959 | Botts |
| 4,226,006 | A | 10/1980 | Toyama |
| 4,227,241 | A | 10/1980 | Marcus |
| 4,275,913 | A | 6/1981 | Marcus |
| 4,275,916 | A | 6/1981 | Skogler |
| 4,668,005 | A | 5/1987 | Dietz |
| 4,679,843 | A | 7/1987 | Spykerman |
| 4,763,946 | A | 8/1988 | Robbins et al. |
| 4,773,698 | A | 9/1988 | Svensson |
| 5,004,289 | A | 4/1991 | Lanser et al. |
| 5,007,532 | A | 4/1991 | Binish |
| 5,054,734 | A | 10/1991 | Gabas |
| 5,056,852 | A | 10/1991 | Miller |
| 5,061,005 | A | 10/1991 | VanOrder et al. |
| 5,066,154 | A | 11/1991 | Renaud |
| 5,074,508 | A | 12/1991 | Powers |
| 5,184,867 | A | 2/1993 | Prillard |
| 5,374,097 | A | 12/1994 | George et al. |
| 5,538,311 | A | 7/1996 | Fusco et al. |
| 5,816,642 | A | 10/1998 | Wilson |
| 6,062,627 | A | 5/2000 | Murdock |
| 6,120,086 | A | 9/2000 | Miller |
| 6,585,308 | B2 | 7/2003 | Sturt et al. |
| 6,604,772 | B2 | 8/2003 | Sturt |
| 7,543,880 | B2 | 6/2009 | Wieczorek |

*Primary Examiner* — Lori L Lyjak
(74) *Attorney, Agent, or Firm* — Raggio & Dinnin, P.C.

(57) ABSTRACT

A D-ring for use with a visor in a vehicle is disclosed. The D-ring includes a body and a pin arranged between two surfaces of the body. The D-ring also includes a leg extending from the body and a first and second arm extending from a side of the body wherein the arms are generally parallel to the leg. The D-ring also includes a first and second flange extending from the body substantially parallel to and in spaced relationship to the arms for receiving and holding a planar object between the flanges and the arms.

20 Claims, 6 Drawing Sheets

D-RING FOR USE WITH A VISOR

TECHNICAL FIELD

The present invention generally relates to adjustable visors for vehicles, and more particularly relates to a visor having a D-ring or center retainer having a flexible tongue or flange arranged thereon for holding tickets, maps or other planar objects.

BACKGROUND OF THE INVENTION

Sun visors for vehicles have been well known and widely used in the prior art. A typical design includes an elongate planar member that is rotatably and pivotally mounted to a vehicle headliner in an automobile. Various designs have developed over the years, some meeting with wide success. As automobile interiors have advanced in complexity, design and styling, supplemental features and various interior components have become increasingly desirable. The advances in the interior design have accompanied an increasing tendency for exterior designs to be more uniform. Thus, an aesthetically pleasing interior design has become the hallmark of the high quality and luxury in modern day automobiles.

Advances in styling and the addition of features, functions and components for interior trim pieces have, in many instances, caused significant cost increases in manufacturing. These increases result from more labor intensive manufacturing steps, as well as a greater number of components and higher costs associated with intricately styled pieces. Accordingly, interior trim designers are constantly searching for new ways to facilitate manufacturing and assembly of interior trim components without sacrificing style. One approach to this goal has been the increasing use of modular components. A wide variety of designs are known in the prior art for snap-in or other relatively easily attached components for various trim features in the vehicle. For example, many automobile visors are manufactured with optional snap-in mirrors, lights, electrical connectors, and similar features. A particular advantage of modular components is that the universal visor bases may be manufactured, and the modular components optionally attached as desired. Thus, relatively cheaper automobiles may call for a relatively simpler visor design that includes a basic visor body portion covered with upholstery and nothing more. Other, high end models may call for a visor body portion having various additional features, for example, electrical connections, lights, mirrors, clips, etc. Designs are known wherein a single visor body portion may be used as the base module for numerous different vehicle interior designs.

Of particular interest to many designers in the visor art has been the provision of storage devices within the vehicle visor system. The desirability of such devices is familiar to many consumers. It is well known to stuff tickets, maps, letters and other paper materials into a flexible band on the visor. Many consumers also simply position a variety of items above the visor, between the visor body portion and the vehicle headliner, relying on the upward bias of the adjustable visor to maintain the items in place. A major disadvantage of this activity is that the visor cannot be rotated or folded down to a position whereby it can shield incoming sunlight without dumping the contents stored above into the lap of the vehicle driver or passenger. Thus, there is a need in the art to provide a simple letter or holder device for storing various flat items on a vehicle visor such that the visor is still capable of being used to block the sun, glare and the like. There also is a need in the art for a D-ring or center retainer that is capable of securing the upholstery fabric against the body of the visor body while also providing a clip or flexible flange for storing letters or other objects thereon. There also is a need in the art for a flange that may be capable of storing planar objects, letters, tickets, etc., between a portion of a D-ring and a surface of the flange. There also is a need in the art for a D-ring with a flange for holding a ticket, letter or other object that is easy to manufacture and install within the automotive vehicle environment. Furthermore, there is a need in the art for a first and second flange that may be arranged on both sides of a visor for use in an automotive vehicle environment.

SUMMARY OF THE INVENTION

One object of the present invention may be to provide a D-ring or center retainer for a visor.

Yet a further object of the present invention may be to provide a visor with a D-ring that includes a flange for holding a letter, ticket, or other planar object thereon.

Still another object of the present invention may be to provide a visor having a D-ring with an arm that engages and holds an upholstery material against the visor body.

Still another object of the present invention may be to provide a D-ring that includes an arm with an angled surface at one end thereof that may engage with the outer surface of a visor body/upholstery material.

Still another object of the present invention may be to provide a D-ring having a flange for holding planar objects or the like that is easy to manufacture, reduce costs, and is easy to install in a visor assembly.

Yet another object of the present invention may be to provide a visor with a D-ring that includes a first and a second flange for holding a letter, ticket or other planar object thereon, wherein one of the first and second flange is arranged on one side of the D-ring and the other flange is arranged on the opposite side of the D-ring of the associated visor.

To achieve the foregoing objects, a D-ring or center retainer for use with a visor in a vehicle is disclosed. The D-ring includes a body and a pin arranged between two surfaces of the body. A leg extends from the body while a first arm extends from a first side of the body and a second arm extends from a second side of the body. A first flange extends from the body substantially parallel to and in a spaced relationship to the first arm for receiving and holding an object between the first flange and the first arm. A second flange extends from the body substantially parallel to and in spaced relationship to the second arm for receiving and holding an object between the second flange and the second arm. One of the first and second flange is arranged on a first side of the body and the other flange is arranged on a second side of the body of the D-ring and the associated visor.

One advantage of the present invention is that it may provide an improved center retainer or D-ring for use with a visor.

Another advantage of the present invention is that it may provide a D-ring that includes a flange extending from a portion of the body to hold and secure a letter, ticket or other planar object between the flange and an arm of the D-ring or a portion of the visor.

Still a further advantage of the present invention is that it may provide a D-ring for use with a visor that includes an arm having an angled surface arranged at an end thereof.

Still another advantage of the present invention is that it may provide a D-ring for use with a visor that is easier to manufacture, lower in cost and easier to install in the visor assembly.

Still another advantage of the present invention is that it may provide a D-ring for use in a visor that includes a first flange extending from a first side of the D-ring body and a second flange extending from a second side of the D-ring body for use in holding and securing a letter, ticket or other planar object or any other known object between the first and second flange and the first and second arm, respectively, of the D-ring.

Other objects, features and advantages of the present invention will become apparent from the subject description and appended claims taken in conjunction with the accompanying drawings.

DESCRIPTION OF THE EMBODIMENT(S)

Figure 1:
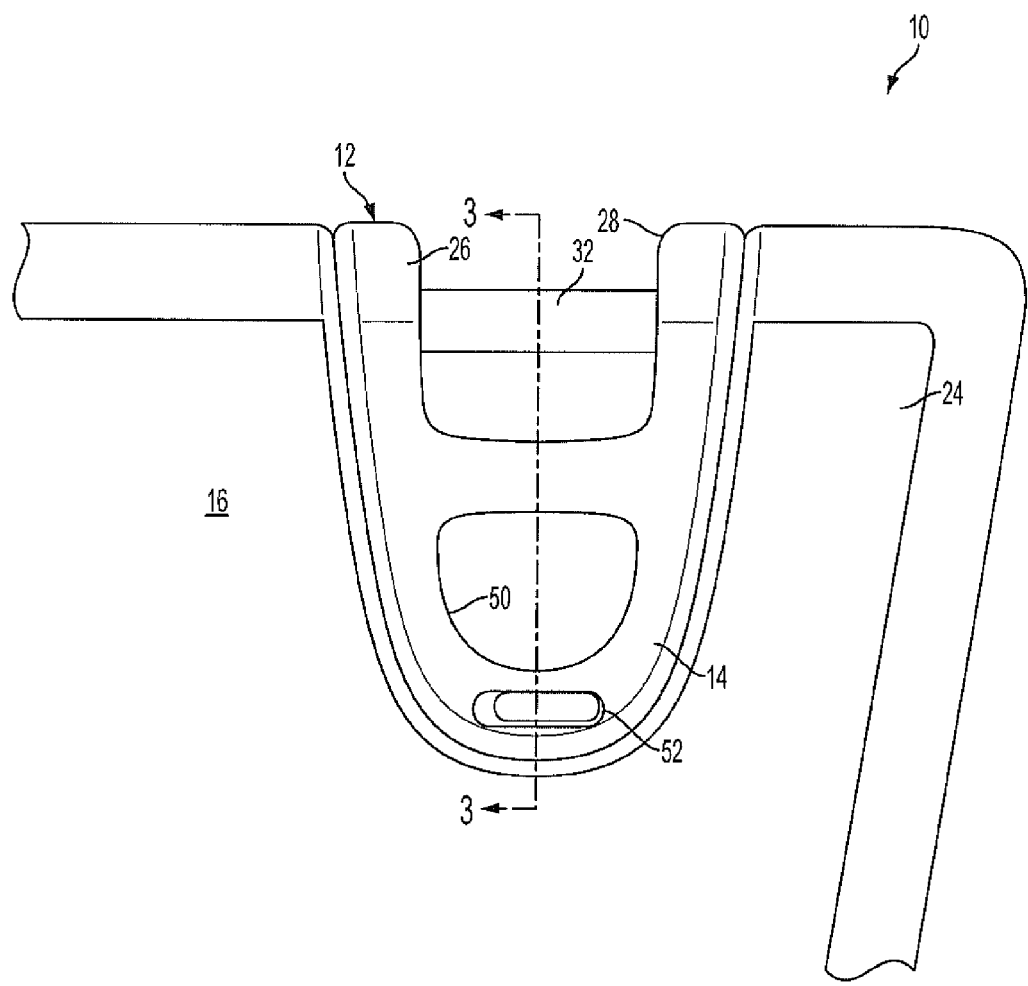
FIG. 1 shows a visor for use in a vehicle according to the present invention.
Figure 2:
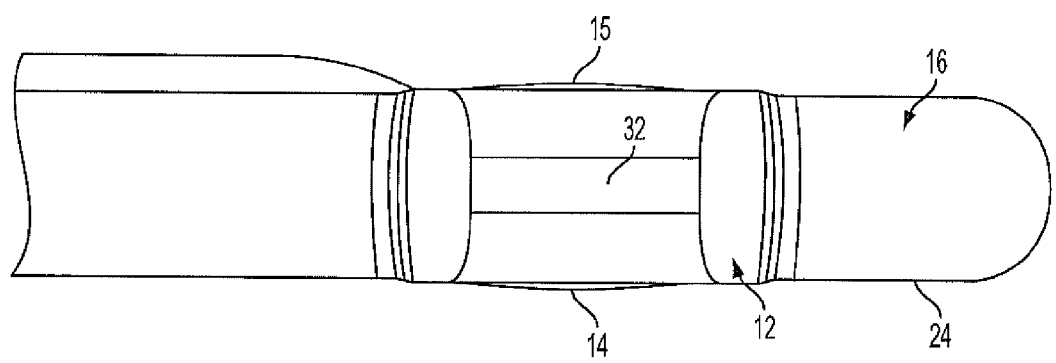
FIG. 2 shows a top view of a visor for a vehicle according to the present invention.

According to the drawings, a visor 10 having a D-ring 12 with a first 14 and second flexible flange 15 for use in a vehicle according to the present invention is shown. The visor 10 generally includes a visor body 16, a visor arm, and a D-ring or center retainer 12 for attaching one end of the visor 10 to a vehicle headliner. The visor arm may include a rod and an elbow that connects to the vehicle headliner and allows for the visor to be rotated to various positions with relation to the passenger or driver of the vehicle to help block the sun and glare therefrom. The visor body 16 may include a first and second visor shell halve 18,20. The visor shell halves 18,20 may be made from any known material such as a plastic or any other material and are engageable to form a clam shell type visor body 16. The visor body 16 may also have defined therein an aperture through which a rod is arranged therethrough and an aperture through which the present invention of a D-ring 12 is arranged therein. The visor body 16 may also include other openings or apertures to receive mirror assemblies, other accessories, map straps or any other known accessory for use on a visor. Any known visor body 16 molded or made of plastic or any other material, such as but not limited to composite, ceramics, plastics, metals, or any other natural material, and formed in either two separate halves or in one molded piece may be used with the present invention of a D-ring 12 having a first and second flexible flange or tongue 14,15 thereon. It should also be noted that the visor 10 having the D-ring 12 with the flexible flanges 14,15 according to the present invention may be used in any known vehicle, such as an automobile, maritime, space craft, train, or any other vehicle for transporting people or objects wherein the sun may need to be blocked to reduce the glare and increase the driving pleasure for the passengers and driver of the vehicles. Any known elbow, rod or visor halves may be used with the visor assembly 10 according to the present invention. The visor assembly 10 also may be covered with an upholstery material or sock 24 preferably made of a cloth that is similar in appearance with the automobile interior. It should be noted that any other material other than cloth, such as leather, fake leather, any natural material, any synthetic material may also be used as a cover or upholstery 24 for the visor body 16. The visor body 16 may be folded in half to form the visor overall shape and then the upholstery cover 24 may cover the outer surface of the visor body 16.

On one end of the visor 10 on a top portion thereof will be inserted a D-ring 12 having a first and second flexible flange 14,15 according to the present invention. The D-ring 12 may be inserted into an orifice 22 of the visor body 16 either before the visor body 16 halves are folded and fastened together and the upholstery 24 is placed there over or after the visor body 16 is folded in half and the upholstery 24 is placed there over. Preferably it will be after the visor body halves 18,20 are secured to one another and the upholstery cover 24 is placed there over. It should be noted that the D-ring 12 generally may be made of a plastic material, however it should be noted that any other metal, ceramic, composite, natural material or the like may be used for the D-ring 12 according to the present invention.

The D-ring 12 generally may have a body 30 that may include a first shoulder 26 and a second shoulder 28 thereon. The body 30 generally may have a saddle like shape, however it should be noted that any other shape may be used for the D-ring body 30 according to the present invention. A pin 32 may extend between two surfaces of the D-ring body 30 and preferably between the first shoulder 26 of the D-ring body 30 and the second shoulder 28 of the D-ring body 30. The pin 32 may be used to interact with and mate with a groove arranged in a member secured to the headliner of the vehicle in which the visor 10 may be used. The pin 32 may interengage with the groove in the member thus, allowing the visor 10 to be secured on one end to the headliner and capable of rotation around the pin 32 into a position to block the sun and glare therefrom. It should be noted that the pin 32 in one contemplated embodiment may be hollow or have an orifice or bore along an entire length thereof. However, it is also contemplated to use a solid pin 32 in the D-ring 12. The pin 32 also may be made of the same material as the D-ring body 30, i.e., generally a plastic, however any other composite, metal, ceramic, natural material or the like may also be used for the pin 32. The pin 32 may have a predetermined length and a predetermined diameter to mate with the groove on the member attached to the headliner of the vehicle and to create the necessary robust connection for the visor body 16.

Figure 3:
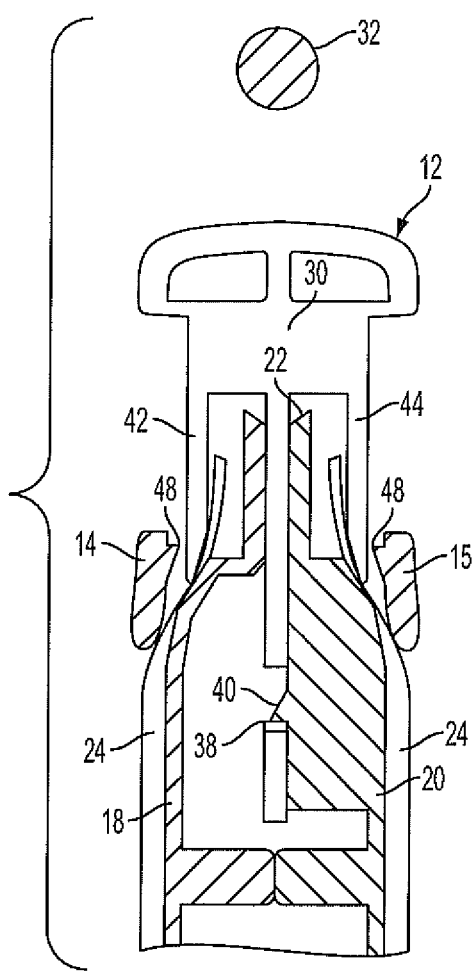
FIG. 3 shows a cross section of the visor and center retainer taken along the line 3-3 of FIG. 1.
Figure 4:
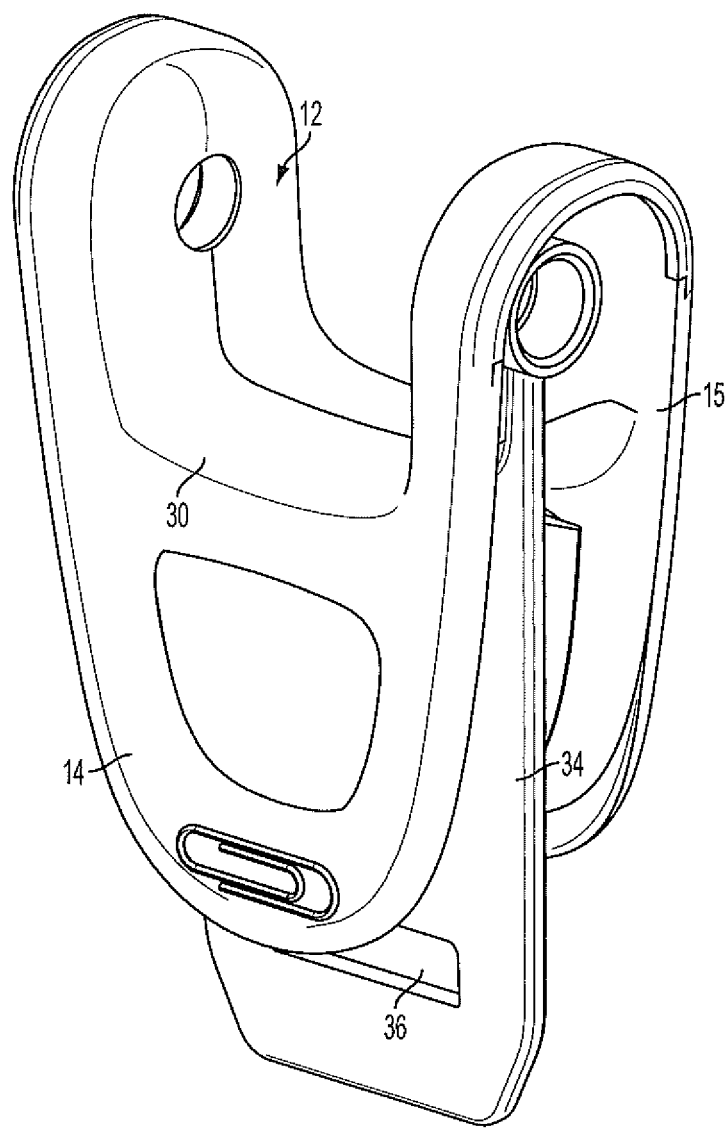
FIG. 4 shows a plan view of a D-ring with a first and second flexible flange according to the present invention.

The D-ring 12 also may include a leg 34 extending from the body 30 in a downward direction away from the pin 32. The leg 34 generally may be aligned with the pin 32 and extend in a direction away from the pin 32 as shown in FIG. 3. Generally, the leg 34 is arranged at a midpoint of the body 30 of the D-ring 12. However, it should be noted that the leg 34 may be offset from the midpoint depending on the design requirements and the vehicle environment in which the visor 10 may be used. The leg 34 may extend a predetermined distance from the body 30 of the D-ring 12 and may have a predetermined shape. In one contemplated embodiment it may have a generally rectangular shape with slightly angled ends on each end thereof to generally form a tongue when viewed from a side. However, it may have any other shape known, such as a quadrilateral shape, triangular shape, any other known or random shape may also be used for the leg 34. The leg 34 may also include an orifice 36 through a surface thereof. The orifice 36 generally is located near a bottom portion of the leg 34. In one contemplated embodiment the orifice 36 generally may have a rectangular like shape, however any other shaped orifice may be used depending on the design requirements of the visor body 16 and the leg 34. The leg 34 may also include a locking surface 38 that may engage with a corresponding locking surface or shoulder 40 of the visor body 16, such that the D-ring 12 may be secured within the visor body 16, thus maybe assisting in holding the visor body 16 together and help in securing in part the upholstery material 24 over the visor body 16 by the D-ring body 30 and associated D-ring arm. The locking surface 38 of the leg 34 generally may interengage with the corresponding locking member 40 arranged on an interior surface of the visor body 16 according to the present invention. The locking surface 38 of the leg 34 generally may in part define an edge of the orifice 36. It should further be noted that the visor body 16 may have an orifice 22 through which the leg 34 of the D-ring 12 may be arranged therethrough for connecting the D-ring 12 to the visor body 16. The leg 34 of the D-ring 12 is contemplated to be arranged within the visor body 16 after the visor halves and the upholstery material 24 have been assembled. However, it is also contemplated to have the D-ring 12 arranged prior to assembly of the visor body 16 and upholstery material 24 in another contemplated embodiment.

Extending from both sides of the D-ring body 30 are a first 42 and second arm 44. The first arm 42 generally extends from a first side of the D-ring body 30 and the second arm 44 generally extends from a second side of the D-ring body 30. The arms 42,44 generally extend a predetermined distance which is approximately one half of the distance that the leg 34 extends from the body 30. However, it should be noted that the arms 42,44 may extend any known distance from the body 30, not just that shown in the drawings. The arms 42,44 generally have a predefined shape that may be wider at the top and narrow at the bottom with a curved surface near the bottom of the arms 42,44. However, it should be noted that any other shaped arms 42,44 may extend from the sides of the D-ring body 30. It should be noted that the arms 42,44 of the D-ring 12 may be arranged such that when the visor body 16 is either in its flipped up or stored position against the headliner of the vehicle, or when the visor is put into its downward position to block the sun and glare, either one of the first arm 42 or second arm 44 may face the dashboard, passenger or driver of the vehicle and the ceiling or headliner of the vehicle in its stored position and either the first 42 or second arm 44 of the D-ring 12 may face the windshield or window and the passenger or driver of the vehicle when the visor is in its downward position to block the sun and glare. It should further be noted that the arms 42,44 may also include an angled surface 46 on an end thereof. The angled surface 46 may be arranged on an inside surface of the first 42 and second arm 44, such that the angled surface 46 of either the first 42 or second arm 44 faces the leg 34 of the D-ring body 30. The angled surface 46 may be used to interact with the upholstery material 24, which may force the upholstery material 24 into contact with the visor body outer surface to ensure that the upholstery material 24 is secured to the visor body 16 at or near the D-ring 12 on the visor body 16. It is also contemplated to use a locking ridge or the angled surface 46 on the first 42 and second arms 44 that may ensure that no planar object, such as a letter, ticket, napkin, etc., may be capable of being placed between the arm 42,44 and the upholstery covering 24 the visor body 16. Hence, in a contemplated alternate embodiment, a locking ridge may serve the dual purpose of ensuring the upholstery material 24 is securely arranged against the visor body 16 and also to prevent letters, tickets or any other planar objects from being arranged between the arm 42,44 of the D-ring 12 and the visor body 16/upholstery 24 arranged there over. It should be noted that the locking ridge that is contemplated may extend towards the leg 34 of the D-ring 12.

Figure 5:
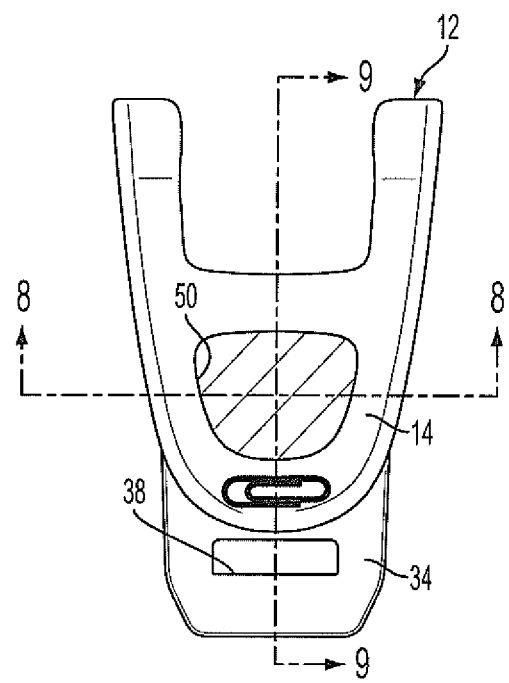
FIG. 5 shows a front view of a D-ring with the first and second flexible flange according to the present invention.
Figure 6:
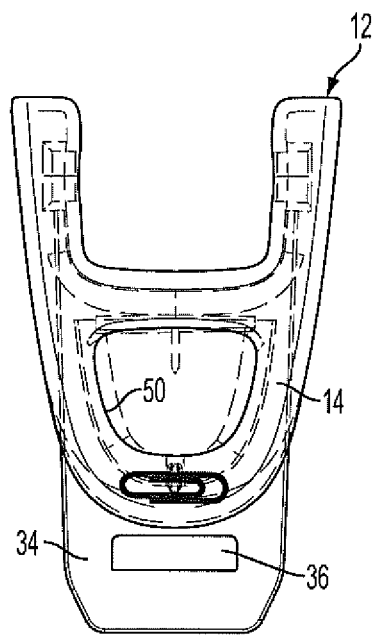
FIG. 6 shows a rear view of a D-ring having a first and second flexible flange according to the present invention.
Figure 7:
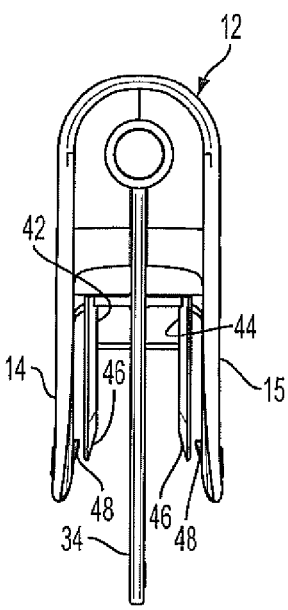
FIG. 7 shows an end view of the D-ring having a first and second flexible flange according to the present invention.
Figure 8:
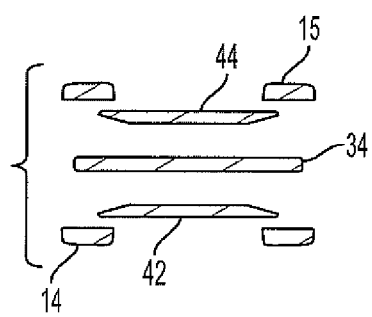
FIG. 8 shows a cross section of the D-ring having a first and second flexible flange taken along line 8-8 of FIG. 5.
Figure 9:
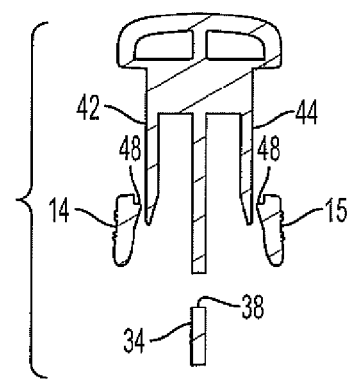
FIG. 9 shows a cross section of the D-ring having a first and second flexible flange taken along 9-9 of FIG. 5.

Extending adjacent to the first and second D-ring arms 42,44 and in spaced relationship therefrom are a first and second flexible flange or tongue 14,15. The first 14 and second flanges 15 generally extend from the D-ring body 30 and are substantially parallel to and in space relationship to the first 42 and second arm 44 respectively, which also extends from the D-ring body 30. The flexible flanges 14,15 generally are parallel to each other and extend further down or longer in distance than the first 42 and second arms 44, however it is also contemplated to have the flexible flanges 14,15 extend the same distance or a lesser or shorter distance than the arms 42,44 depending on the design requirements, the planar objects and other objects that may be held by the flexible flanges 14,15 etc. It should also be noted that it is also contemplated to have the flexible flanges 14,15 designed such that they can hold objects that are of any known shape and not just planar objects as discussed above. The flexible flanges 14,15 may have a predetermined gap defined between the inner surface of the flexible flange 14,15 and an outer surface of the arm 42,44 next to which one of the two flexible flanges 14,15 is arranged. Generally, the flexible flange 14,15 and the associated arm 42,44 are generally parallel to one another, however other contemplated embodiments may be used. The flexible flanges 14,15 may also include a locking ridge or tooth 48 extending from an inside surface thereof. Generally, this locking ridge or tooth 48 may be arranged near an end of the flexible flange 14,15. The locking ridge 48 of the flexible flange 14,15 may be arranged near or at an end, but it is also contemplated to be arranged at other areas on the inside surface of the flexible flange 14,15. Furthermore, the locking ridge 48 and flexible flange 14,15 generally are directly, adjacent to an outside surface of the arm 42,44 and in one contemplated embodiment may have contact with the outer surface of the arm 42,44 prior to insertion of an object therebetween. However, it is also contemplated that no surface contact may occur between the flexible flange 14,15 and the outer surface of the arm 42,44 before insertion of an object therebetween. The use of a first 14 and second flexible flange 15 may allow for the user of the vehicle, either a passenger or the driver, to arrange material on both the back side or front side of the visor 10 to ensure for the most flexible storage capacity of a visor 10 in a vehicle. It may be contemplated to store letters on one side of the visor 10 and note pad paper on the opposite side of the visor 10 with the use of a dual ticket clip, one on each side of the visor body 16 may ensure for the greatest flexibility to the user of the vehicles in storing planar objects or any other known objects on either side of the visor 10. It should further be noted that the flexible flanges 14,15 of the present invention may also include an orifice 50 through a surface of the first 14 or second flange 15. The orifice 50 generally may have a predetermined shape. The orifice 50 is generally arranged near a center or midpoint of the first 14 and second flange 15. In one contemplated embodiment as shown in FIGS. 5 and 6, the orifice 50 may have a generally tongue or U-shape when viewed from a side. However, it should be noted that any other shaped orifice 50 may be arranged through the surface of the first 14 and second flange 15 according to the present invention. It is also contemplated that no orifice may be arranged through the first 14 and second flanges 15 of the D-ring 12 according to the present invention. It is also contemplated to have an image 52 on an outer surface of both or only one of the first 14 and second flange 15 according to the present invention and any known image may be molded thereon, such as a paperclip as shown in the drawings, or any other known image.

In operation, a user of the automotive vehicle may place the visor 10 in its, upward stored position against the headliner of the vehicle and if need be can store any planar objects, such as a letter, a ticket, parking ticket, parking pass, credit card, or any other generally planar or non planar object between either the first flexible flange 14 and the first arm 42 or the second flexible flange 15 and the second arm 44 of the D-ring 12 of the visor 10. Therefore, the flanges 14,15 extending from the body 30 of the D-ring 12 may be substantially parallel and in spaced relationship to the arms 42,44 which also extend from the body 30 inside of the flexible flanges 14,15 and may be arranged such that it may be capable of receiving and holding a planar object between the flanges 14,15 and the arms 42,44, respectively, to secure the object and create two storage areas for the passenger or driver of the vehicle having the visor 10 with the D-ring 12 according to the present invention. Therefore, a ticket, paper, letter, or other planar object, or any other known object, may be stored in the D-ring 12 of the present invention and may have that planar object stored between the flanges 14,15 and the outer surface of the arms 42,44 of the D-ring 12. It is also contemplated to not allow any type of ticket member or planar object to be arranged between the arm 42,44 and the material 24 covering the visor 10 in one contemplated embodiment. With the D-ring 12 being made of a generally plastic material, the arms 42,44 and/or flanges 4,15 may have a predetermined spring coefficient designed therein such that the flexibility of the flexible flanges 14,15 being moved away from the arms 42,44 may urge, through its inherent spring force, the flexible flanges 14,15 back towards the outer surface of the arms 42,44 of the D-ring 12 thus securing any planar object held therebetween from becoming dislodged during normal operating and crash situations of the vehicle in which the visor 10 may be used. It is also contemplated to secure via any known locking mechanism or device an object to either the first 14 or second flange 15 of the D-ring 12 by placing such object through the orifice 50 of either the first 14 or second flange 15 and securing via the orifice 50 any object therefrom, such as a keychain ring, pen, pencil, etc.

It should be noted that any known design shapes may be used for the D-ring body 30, D-ring leg 31, D-ring arms 42,44 and D-ring flexible flanges 14,15 depending on the design requirements and the aesthetics necessary for the automobile in which the D-ring 12 may be used therein.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A D-ring for use with a visor in a vehicle, said D-ring including:
   a body;
   a pin arranged between two surfaces of said body;
   a leg extending from said body;
   a first arm extending from a first side of said body;
   a second arm extending from a second side of said body;
   a first flanged extending from said body substantially parallel to and in spaced relationship to said first arm for receiving and holding an object between said first flange and said first arm; and
   a second flange extending from said body substantially parallel to and in spaced relationship to said second arm for receiving and holding an object between said second flange and said second arm.

2. The D-ring of claim 1 wherein said body generally having a saddle like shape.

3. The D-ring of claim 1 wherein said leg having an orifice through a surface thereof.

4. The D-ring of claim 3 wherein said leg having a locking surface, said locking surface in part defines an edge of said orifice.

5. The D-ring of claim 4 wherein said leg extends from a generally midpoint of said body.

6. The D-ring of claim 1 wherein said first and second arms each having an angled surface at one end thereof, said angled surface facing said leg.

7. The D-ring of claim 1 wherein said first and second flanges each having a locking ridge extending from an inside surface thereof.

8. The D-ring of claim 1 wherein said first and second flanges each having an orifice through a surface thereof.

9. The D-ring of claim 7 wherein said locking ridge is arranged generally near an end of said first and second flanges.

10. The D-ring of claim 7 wherein said locking ridge is directly adjacent to an outside surface of said first or second arms.

11. The D-ring of claim 1 wherein said pin is hollow.

12. A visor for use in a vehicle, said visor including:
    a visor body;
    a cover arranged over said visor body;
    a D-ring member connected to said visor body near one end of said visor body;
    said D-ring member including:
      a body;
      a pin arranged between two surfaces of said body;
      a leg extending from said body into said visor body;
      a first arm extending from a first side of said body;
      a second arm extending from a second side of said body;
      a first flanged extending from said body substantially parallel to and in spaced relationship to said first arm for receiving and holding an object between said first flange and said first arm; and
      a second flange extending from said body substantially parallel to and in spaced relationship to said second arm for receiving and holding an object between said second flange and said second arm.

13. The visor of claim 12 wherein said leg having an orifice through a surface thereof.

14. The visor of claim 13 wherein said leg having a locking surface, said locking surface interengages with a surface of said visor body to secure said D-ring member to said visor body.

15. The visor of claim 12 wherein said leg extends from a generally midpoint of said body.

16. The visor of claim 12 wherein said first and second arms each having an angled surface at an end thereof, said angled surface facing said leg.

17. The visor of claim 12 wherein said first and second flanges having a locking ridge extending from an inside surface thereof.

18. The visor of claim 12 wherein said first and second flanges having an orifice through a surface thereof.

19. The visor of claim 17 wherein said locking ridge is arranged generally near an end of said first and second flanges and is arranged directly adjacent to an outside surface of said first and second arms, respectively.

20. The visor of claim 12 wherein said pin is solid.

* * * * *